Feb. 21, 1950     R. S. WALLACH     2,498,596
TIRE INFLATION DEVICE
Filed July 3, 1946
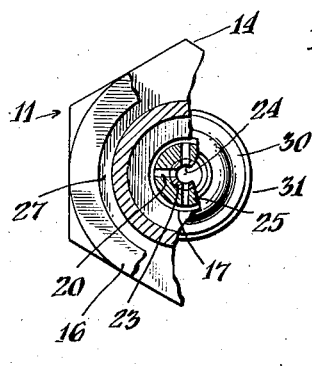
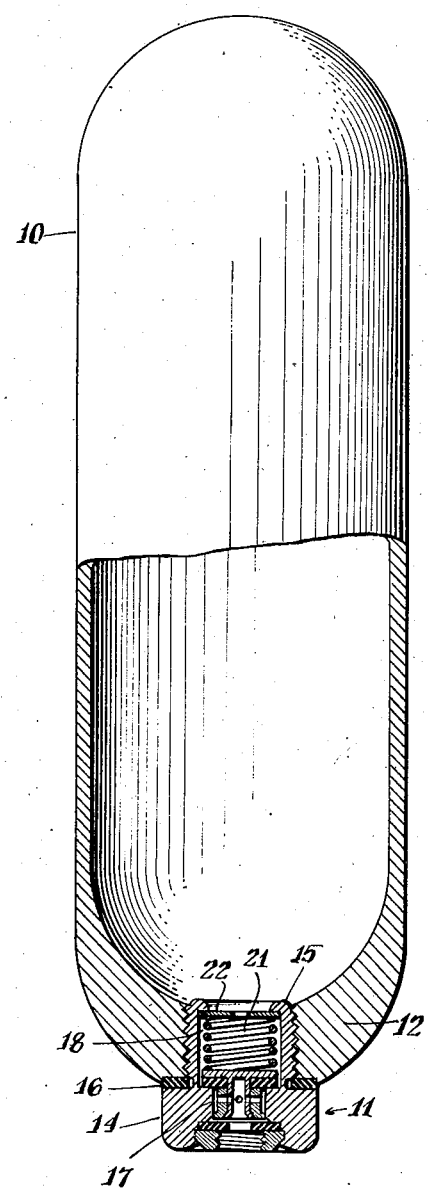
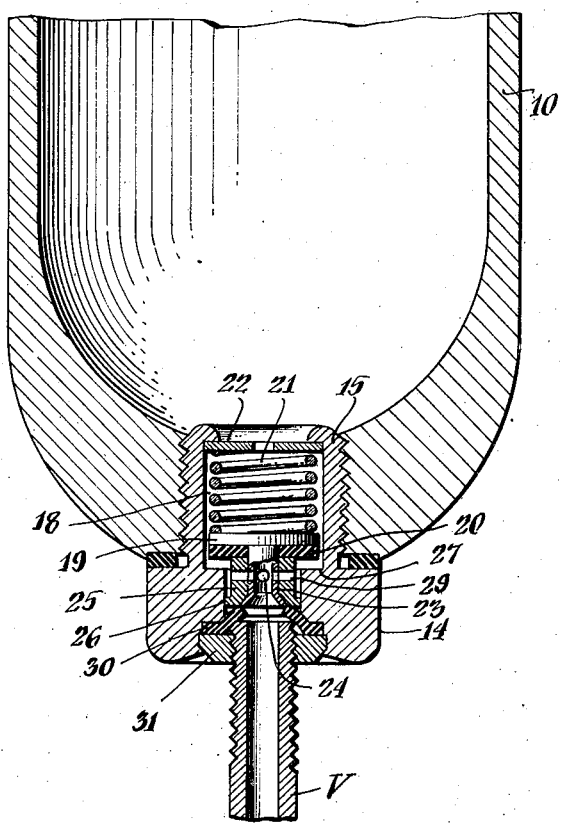
INVENTOR.
Robert S. Wallach
BY Duell, Kane & Smoot
ATTORNEYS Patented Feb. 21, 1950

2,498,596

UNITED STATES PATENT OFFICE 2,498,596

TIRE INFLATION DEVICE

Robert S. Wallach, Madison, N. J., assignor to Associated Development & Research Corporation, New York, N. Y., a corporation of New York Application July 3, 1946, Serial No. 681,389

2 Claims. (Cl. 222—3)

This invention relates to an improved compressed gas unit and particularly to a unit of relatively small size for use as an emergency means for inflating pneumatic tires.

It is a principal object of the invention to provide a compressed gas unit of such size that it may conveniently be held in the hand, to be screwed on to the stem of a tire valve, to discharge the gas content into the tire.

It is an object of the invention to provide a compressed gas unit having an improved valve which opens to permit the release of the gas, merely upon screwing the container on to the valve stem.

It is an object of the invention to provide a pneumatic tire inflation unit of substantially bulb-like form having at one end an automatic valve means, said unit being so weighted as to concentrate its point of balance at the valve end, thereby making the unit more easily handled and affixed to the valve.

It is an object of the invention to provide a tire-inflation unit adapted to be screwed on to a tire valve stem, said unit being so designed as to concentrate its weight at the tire valve so that no undue bending stresses will be imposed on the valve when the unit is screwed thereon.

It is an object of the invention to provide an improved valve unit for a tire inflation unit, said valve incorporating means to prevent leakage of gas around the outer wall of the tire valve when gas is discharging from the unit into the tire valve.

It is still another object of the invention to provide a tire inflation unit having valve means which will automatically open when the unit is screwed on to a standard tire valve, and said valve having means to prevent escape of gas around the tire valve even though the threads on the tire valve may be worn or slightly imperfect.

Other features and advantages will hereinafter be apparent from the detailed description which follows.

In the accompanying drawings:

Fig. 1 is an elevation of the unit, in section through the valve element, showing the valve in closed position;

Fig. 2 is an enlarged sectional view of the valve end of the unit, showing the valve as it is opened by the action of the tire valve stem;

Fig. 3 is a view looking toward the valve from the inside of the casing, said figure being partly in section to reveal structural details.

A preferred form of the tire inflation unit embodying the invention is illustrated in Fig. 1, in which a bulb-like vessel 10, fabricated of steel or the like and having sufficient strength for confining a gas such as carbon dioxide under high pressure, is provided at one end with a valve assembly 11. It will be noted that the valve end of the vessel has a substantial wall thickness at 12, which serves a double function of providing for the screw threaded insertion of the valve unit and for concentrating the weight or balance of the unit at the valve end. In other words, the wall thickness, and hence the weight is materially greater at the valve end than at any other portion of the container. Such concentration of weight improves the "feel" of the unit when it is held in the hand preparatory to use, and when the unit is screwed on to the tubular body V of a tire valve, the balance point of the unit is at the tire valve, which minimizes any bending stress on the tire valve when the unit is supported in slightly angular position by the valve stem.

The valve assembly includes a relatively heavy nut-like body 14 having a preferably concentric tubular extension 15. The tubular extension is screw threaded for engagement with a tapped axial opening in the container. A valve body seal or gasket 16 may be utilized to prevent leakage about the valve body when the valve is in closed position.

The valve body 14 has a cylindrical bore 17 which coaxially communicates with the relatively much larger interior chamber 18 of the extension 15. Said chamber accommodates the disc-like head 19 and valve seal 20 of a poppet valve, and also accommodates the closure spring 21 which is confined between the head 19 and an annular spring retainer 22. Said spring retainer is held by curling over the end of the tubular extension, as shown.

Extending centrally downwardly from the valve head 19 is a tubular stem 23, provided with a plurality of side wall openings 24. Disposed about said stem is a guide sleeve 25 the end of which is flanged as at 26 to slidably engage the side walls of the passage 17. It will be noted that an annular passage exists between the outer wall of guide sleeve 25 and the inner wall of the bore 17. The sleeve 25 has openings 29 registering with the openings 24 of the stem 23, whereupon communication is afforded between said annular passage and the axial passage of the valve stem.

The valve disc or seal 20, which is preferably of resilient material, is advantageously clamped between sleeve 25 and the valve head 19 by expanding the end of the valve stem into a chamber at the end of the sleeve 25.

The relative difference in diameters of the bore 17 and chamber 18 provides a valve seat 27 against which the sealing disc 20 seats under the combined urging or spring 21 and the pressure of gas within the vessel.

The valve body 14 is axially counterbored to provide a space within which there is disposed a resilient lower seal 30. Seal 30 is annular, the opening therethrough being concentric with the valve stem passage, and it is of such size that a substantial portion of the seal 30 underlies the lowermost wall of the valve stem and guide sleeve assembly.

An annular seal retainer 31, tapped coaxially with the valve stem opening, confines the seal retainer in position. The valve body is staked inwardly to secure the retainer.

The retainer 31 is tapped to suit the thread of the male threaded device which is to be used with the unit, such for example as the aforesaid tubular body of a tire valve, whereupon the unit may be secured on to said body. It will be noted from Fig. 2 that the center opening of the lower seal 30 is of such diameter relative to the tapped passage of retainer 31 to permit the unsupported central portion of seal 30 to be engaged by the upper end of the tire valve body as the unit is screwed thereon, whereupon the wall of the valve body exerts pressure against the lower seal, flexing it upwardly to bear against the valve sleeve assembly to lift the valve into unseated position. Gas will then discharge into the chamber 18 and the annular space about the valve stem, and thence into the stem for passage into tire valve V.

It is preferable to bevel the upper edge of the lower seal chamber provided in valve body 14 to permit the desired upward and inward angular displacement of the seal.

It is frequently the case that the threading on a tire valve body is not perfect, due to carelessness in changing tires or for other reasons. The seal 30 therefore forms a gasket between the valve stem and the edge of the tire valve body which prevents any leakage of gas around the outside of the valve body.

A unit having a volumetric capacity of about 12.5 cubic inches will contain compressed gas sufficient for inflation of the usual range of passenger car tire sizes. If it is not necessary to use the entire gas charge to inflate a tire to proper pressure, the valve automatically reseats after removal of the unit from the tire valve.

Although the invention has been described by making a fully detailed reference to a certain presently preferred embodiment, such detail of description is to be understood in an instructive rather than a limiting sense, many changes being possible within the scope of the claims hereto appended.

I claim:

1. Tire inflation means comprising a relatively small size container of gas under high pressure; a valve body secured within an end wall of said container in communication with the interior thereof, said valve body having an end opening threaded for screwing upon the threaded body of a tire valve, a smooth walled bore of larger diameter concentric with said end opening, and a cylindrical chamber communicating with and concentric with said bore and opening into said container; a valve seat at the base of said cylindrical chamber; a poppet valve disposed within said cylinder for cooperation with said seat and having a tubular stem extending into said bore, said stem being of smaller diameter than said tire valve body and having side wall openings; metallic sleeve means disposed snugly about said stem and in contact with the wall of said bore for guiding the valve stem for axial movement within said bore; and means disposed within said bore for engagement by the end of said tire valve body and movable upwardly against said sleeve means for unseating said valve when said container is screwed on to the end of said tire valve body.

2. A valve, comprising a body having a tubular valve chamber extending axially therefrom, a smooth walled axial bore extending through said body and communicating with said chamber; valve seat means surrounding said bore within said valve chamber; a valve member having a valve head within said chamber and a tubular stem extending therefrom into said bore; a valve stem guide sleeve disposed about said stem and being of less diameter than the axial body bore, said guide sleeve having flange means extending outwardly into slidable engagement with said bore, said stem and guide sleeve having registering openings through the sides thereof between said flange and said head to afford communication between said axial bore and the interior of said valve stem; valve disc means disposed about said stem intermediate said guide sleeve and said head; means for securing together said stem and said guide sleeve; and spring means within said valve chamber and engaging with said valve head to urge the valve member normally into seated position.

ROBERT S. WALLACH.

REFERENCES CITED

The following references are of record in the file of this patent:

UNITED STATES PATENTS

| Number | Name | Date |
| --- | --- | --- |
| 765,022 | Loewenstein et al. | July 12, 1904 |
| 827,926 | Levantine et al. | Aug. 7, 1906 |
| 1,344,028 | Ewald | July 22, 1920 |
| 1,359,795 | Delahey et al. | Nov. 23, 1920 |
| 1,526,271 | Ewald | Feb. 10, 1925 |
| 1,626,456 | Fairbanks | Apr. 26, 1927 |
| 1,676,777 | Hansen | July 10, 1928 |
| 1,701,162 | Norgren | Feb. 5, 1929 |